Oct. 13, 1964 M. FINIGIAN 3,153,149

PHOTOSENSITIVE ELECTRO-OPTICAL DEVICE WITH ELECTROSTATIC SHIELDING MEANS

Filed Aug. 20, 1962

INVENTOR
MARTIN FINIGIAN

BY Herbert W. Arnold
ATTORNEY 3,153,149

PHOTOSENSITIVE ELECTRO-OPTICAL DEVICE WITH ELECTROSTATIC SHIELDING MEANS

Martin Finigian, Melrose, Mass., assignor to Raytheon Company, Lexington, Mass., a corporation of Delaware
Filed Aug. 20, 1962, Ser. No. 218,086
7 Claims. (Cl. 250—239)

This invention relates to electro-optical devices and more particularly to an insulation medium and shielding means for electrically isolating the control circuit of electro-optical devices from the signal circuit while providing an optical path therebetween.

In many applications it is desirable to utilize a device which is controlled by a signal applied to a control circuit, but in which the signal appearing in the output circuit is independent of any coupling effect between the control signal and the input signal. For example, relays or switching circuits in which no electrical coupling exists between the control which actuates the device and the output signal finally emerging from the device will result in improved operation since the output signal will be free of spurious noise which would be otherwise introduced by the control function. However, prior art devices ordinarily use mechanical contacts in the performance of the switching functions, which, as is recognized, are subject to failure, are ordinarily relatively slow in operation and also commonly introduce spurious undersirable noise signals into the output circuit.

The present invention is accordingly directed toward a novel device structure in which a first control current may be used to control a second output current by transforming the first control current into light and then utilizing the light to vary the resistance in an independent circuit in order to control the output current of the second circuit. To accomplish this, my invention generally provides a light-tight casing into which is positioned a suitable light source and a light-responsive resistance element whose resistance varies with the intensity of the light emanating from the light source. The light source and the variable resistance element are disposed within the outer casing, and are positioned in end-to-end relationship in order that directed control of the light from the light source may be achieved. A control signal source is applied to the light source while the input and output circuits of the signal to be controlled are connected to the variable resistance element. Modulation of the control signal applied to the light source results in varying intensity of the light which, in turn, causes the input signal applied to the variable resistance element to be modulated in accordance with the control signals.

In order to take advantage of the useful properties of the above device in high-voltage applications such as, for example, control of high voltage power supplies, bias control of high voltage regulators tubes and metering of any circuit at a high potential with respect to ground while at the same time obtaining volume efficiency, it becomes necessary to provide an insulating medium between the control circuit and the signal circuit to prevent flashover therebetween. Accordingly, my invention provides a high dielectric optically transparent elastomeric medium of a high damping characteristic between the control circuit and the signal circuit. The medium thus allows the operation of said electro-optical devices at voltages far in excess of that contemplated by prior art devices operating under the same confined spatial relationship in air or vacuum. Since the medium is disposed intermediate said control and signal circuit it is further provided in accordance with my invention that the medium be optically clear. By "optically clear" is meant that all wavelengths of visible light are passed substantially unchanged through the medium. In this manner, an all-purpose media is provided which can be successfully used with various combinations of light sources and photosensitive elements. For example, some light sources produce a predominantly red spectrum of light, whereas others produce blue. Likewise, some photocells are more sensitive to reds than blues. Thus, the requirement that the dielectric media between the two transmit light uniformly in order to be of universal application.

Further advantages, such as reduction of mechanical stress and localization of bubbles or voids, are obtained by the use of said fluid in the present device. These advantages result primarily from the gelatinous or highly viscous nature of said medium.

Mechanical stress, such as alternating stresses by forces external to the device, and having a natural period which coincides with that of a structural member in the device, induce in the structure a resonant vibration resulting in greatly enhanced stresses within the device. The gelatinous fluid or elastomeric medium provided in accordance with this invention has a relatively high damping capacity, which property allows said medium to absorb or partially dampen out vibrations, thus limiting the induced stresses.

Voids or bubbles of trapped gases are present in most potting or encapsulating materials such as are contemplated in this invention. These voids provides an area of relatively low dielectric strength and in the presence of a high electrostatic field tend to cause ionization so that such voids must be located in a low voltage stress area for optimum performance. The present device purposely provides a controlled air space within the light-tight casing to allow for thermal expansion of the fluid. This air space is "controlled" in that its location may be fixed at a point of low voltage gradient and consequent low susceptibility to corona breakdown. Once the space is fixed it will remain so because of the gelatinous property of said medium as contrasted to a low viscosity fluid such as oil, for example, which would seek its level upon rotation or displacement of the container and thereby relocate the void or space at a point of higher voltage gradient.

An additional problem caused by the corona effect is encountered in the use of electro-optical devices in close proximity to high electrostatic fields, such as are contemplated herein. As is well known, corona is a luminous discharge effect due to ionization of gases surrounding a conductor about which a voltage gradient exceeding a certain value exists.

To minimize this effect the invention further provides a wire mesh screen enclosure about both the light source and light-responsive resistance element which prevents penetration of the electrostatic field into the enclosure. This shield thus serves to minimize the effect of high voltage on the gaseous media present in both the light source and the light sensitive elements. The wire mesh enclosure also serves to minimize capacitive coupling between the control and signal circuits, thus preventing A.C. voltage at the control circuit from being coupled to the signal circuit.

The invention will be better understood as the following description proceeds taken in conjunction with the accompanying drawing in which like reference numerals indicate like elements and wherein.

Figure 1:
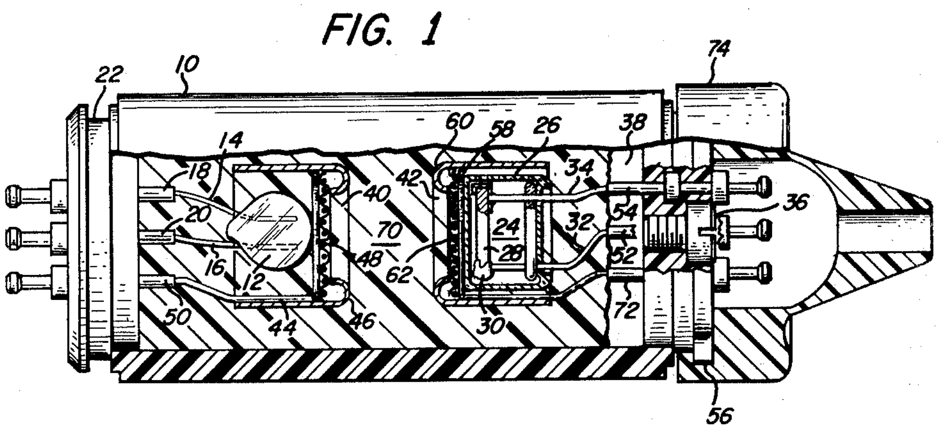
FIG. 1 is an elevational, cross-sectioned view of a device in accordance with the present invention.

Referring now to the drawing, and more particularly to FIG. 1 thereof, there is shown a specific embodiment of an electro-optical device in accordance with the present invention comprising an outer casing 10 composed of an opaque, non-conductive material such as a plastic epoxy resin dyed black and provided with a suitable pigment or filler.

In the particular example being described casing 10 is a hollow cylinder. Positioned in the left-hand section of the case 10 is an appropriate light source, as, for example, a neon bulb 12 having external conducting leads 14 and 16 which are coupled to terminal studs 18 and 20, said terminals being embedded in terminal cap 22 also composed of an opaque material similar to case 10. Terminal cap 22 is bonded at its periphery to casing 10 as shown in FIG. 1, thus completely enclosing the left-hand chamber of the device in a light-tight structure. The right-hand end of the case 10 contains the light-sensitive variable resistance element of the device. This preferably may take the form of a photo-sensitive semiconductive element designated generally as 24 and which is positioned within a light transparent receptacle 26. The light transparent receptacle 26 may be composed of any suitable light transparent material as, for example, glass. The photo-sensitive semiconductive element 24 may be composed of any suitable semiconducting material whose resistance varies in response to light, as, for example, lead sulphide. In the drawing, the exposed lead sulphide portion is indicated by the numeral 28. Surrounding the portion 28 on two sides are indium-plated areas 30 and 31 which make contact with opposite sides of the lead sulphide 28. Electrical conducting leads 32 and 34 are respectively connected to opposing portions of the indium plates and constitute the input and output leads to the device 24. Conducting leads 32 and 34 are coupled to terminal studs 52 and 54 respectively. Terminal studs 52 and 54 are embedded in opaque terminal cap 56 bounded at its periphery to case 10, thus completely enclosing the device in a light-tight container while providing electrical connections to the light source and photocell. An insulating safety cover 74 is also provided about cap 56 which is pressed on cap 56 through a keyed slot and held in place by a flat spring which is not shown.

In order to enhance the electrical insulation between the light resistive element circuit 24 and the bulb circuit 12 the invention provides a gelatinous material 70 such as a transparent silicone rubber gum which completely surrounds both structures. This material is introduced in fluid form as by pouring into the container 10 under vacuum through a hole provided upon removal of screw 36. The container is positioned in a suitable manner and subjected to a controlled temperature environment which simulates the maximum anticipated operating temperature of the device and which may be, for example, in the order of 100° C. This causes the material to gelatinize and expand. The material is allowed to spill out of the container through a hole provided at screw 36. The container is then sealed or capped while at this maximum temperature by replacing screw 36 so as to provide a light-tight cover. Upon cooling a void is formed by contraction of the now gelled material. In practice this void is located at an area of relatively low field intensity which may be, for example, the area designated at 38. The position of the container during the vulcanizing or curing process determines the location of space 38. In the example shown, the container was positioned on end with cap 56 on top. Thus, the action of gravity causes the void to be located at the top or cap 56 end. The material, when properly cured by heating as above, develops into a soft, transparent, jelly-like mass having excellent thermal and dielectric properties over wide temperature extremes. Since the material will not flow under its own weight, the controlled air space created by contraction will be maintained under all container mounting conditions. Furthermore, the damaging stresses of thermal expansion common to rigid potting materials are safely absorbed by this gelatinous medium. The material does have sufficient strength coupled with the rigidity of terminal leads 14, 16, 32 and 34 to support the structure of the light source 12 and photocell 24. Representative examples of the material 10 used herein are general purpose gums made by catalytic polymerization using a peroxide type catalyst of an unsaturated silicone resin. Representative of these resins are the unsaturated methyl silicones and the polymethylsiloxanes. Useful resins are those polymerized to gels or gums or very viscous fluids whose viscosity is in the 10,000 centipoise range and higher. Gums useful at lower temperatures can be achieved by replacing about 5 perecnt of the methyl groups by phenyl or other groups. In addition, suitable mediums may be obtained by building a group such as a fluorocarbon, nitrile or vinyl into the silicone. The dielectric strength of such materials is between 400 and 1,000 volts per mil at 23° C. and have dielectric constants between 2 and 4 from 100 cycles per second to .01 megacycle.

Referring again to FIG. 1, the corona preventive shielding apparatus of my invention can be seen to comprise the shield assembly structures designated generally at 40 and 42, and which form a protective barrier around the bulb and photocell respectively. The two structures are physically identical. As can be seen, shield assembly 40 is composed of a metallic shield support 44, a metallic tubular formed structure 46 and a metallic wire mesh screen 48, all soldered or brazed together in the position shown. Metallic shield support 44 is coupled to terminal stud 50 embedded in terminal cap 22. Likewise, shield assembly 42 is comprised of a shield support 58, tubular structure 60 and wire screen 62, each soldered, welded or brazed together in the position shown. Similarly, shield support 58 is conductively coupled to terminal 72 on terminal cap 56. It can thus be seen that a protective, rugged, metallic structure is provided in accordance with my invention about the sensitive light source and photocell structures. In addition, this device also includes provisions for externally connecting the metallic structures to a predetermined potential which will minimize the effective field gradient sensed by the delicate, ionizable, light source and photocell elements. A typical circuit arrangement showing the actual external connections will be subsequently described in connection with FIG. 2. At this point it is important, however, to note that the shape of structures 42 and 40 is such that a smooth and uniform surface is presented between the two structures, characterized by the absence of sharp corners or discontinuities, thus minimizing the formation of corona points.

In the embodiment illustrated in FIG. 1, the spacing between the bulb 12 which may be an NE24 gas bulb, and the light-sensitive element 24, is a predetermined function of the maximum anticipated voltage requirements and the dielectric properties of the container housing 10 and insulating medium 70. The use of the flat semiconductive element 24 having electrodes positioned at opposite edges results in low capacity which enables the device to successfully handle high frequency signals. Thus, the device of FIG. 1 presents a light source and a variable resistance photo-responsive element positioned within the same package but isolated from each other both physically and electrically. Further, the positioning of the bulb 12 in end-to-end relationship with the element 24 concentrates the light emitted from the bulb 12 directly onto the photo-sensitive surface of the element 24.

Figures 2, 3, 4:
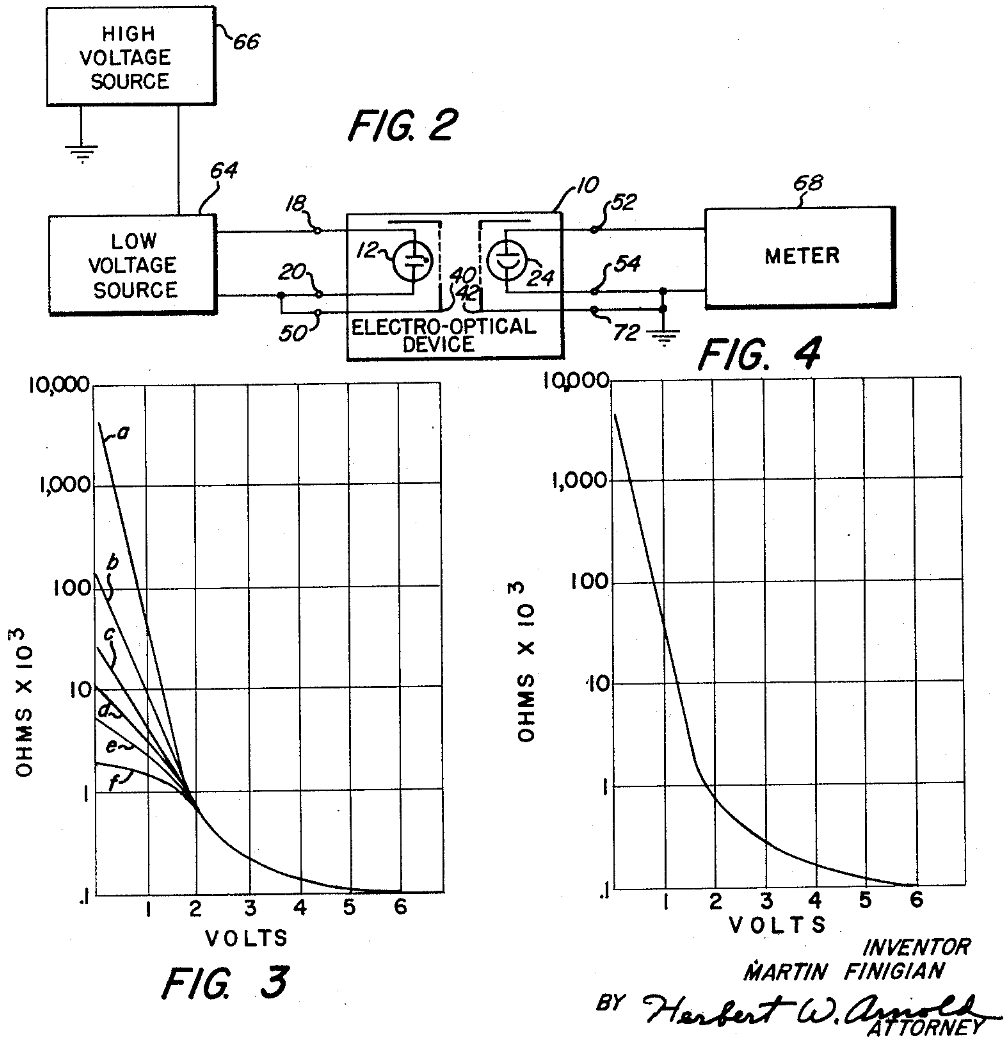
FIG. 2 is a simplified circuit diagram illustrating one form of a circuit arrangement in which the device of FIG. 1 may be utilized.
FIG. 3 is a graphic illustration of the performance of the device of FIG. 1 utilized in the circuit arrangement of FIG. 2 wherein the wire mesh screen is removed.
FIG. 4 is a graphic illustration of the performance of the device of FIG. 1 utilized in the circuit arrangement of FIG. 2 wherein the wire mesh screen is retained.

Referring now to FIG. 2, there is shown a simplified circuit diagram illustrating one use of the device in accordance with the present invention. As shown, the block designated generally as 10 corresponds to the outer casing of the device while the numerals 12 and 24 designate the light source and light-sensitive elements respectively of the device of FIG. 1. Similarly, the structure of the corona shield about the light source and light sensitive element is shown and designated by numerals 42 and 40. A pair of control terminals from low power source 64 are connected to the control terminals 20 and 18 of the light source 12. A pair of signal input terminals from a suitably calibrated ohm meter 68 is connected to the signal terminals 52 and 54 of the light-sensitive element 24. In practice, low voltage source 64 may be a device which provides filament voltage for a rectifier tube. As is usually the case in such applications, this filament power for the rectifier tubes is commonly obtained from a transformer secondary coupled to the same coil that develops the high voltage. Thus, the low voltage source 64 is biased to a very high voltage such as from 10,000 to 20,000 volts by high voltage source 66. An example of such a rectifier circuit is shown on page 728 as FIG. 20–17 of the text "Electrical and Electronic Engineering Series" by Frederick Emmons Terman, published by McGraw-Hill Book Company, Inc., copyright 1955.

The circuit arrangement as thus shown provides a means for monitoring, for example, the filament supply to a high voltage tube. Thus, when the light source is not lit, that is, when no control signal from low voltage source 64 is applied to terminals 20 and 18, the photo-sensitive element 24 exhibits very high resistance approaching an open circuit as displayed by ohm meter 68. However, when the light source 12 is energized by the application of a control signal, the photo-sensitive element 24 approaches a short circuit since the resistance is lowered to an extremely small value due to the action of the light. Furthermore, variations in lamp voltage result in correspondingly detectable changes in the resistance value of element 24 as shown in FIGS. 3 and 4.

A problem exists, however, in the application of a device as thus far described in high voltage electrostatic field environments because of the aforementioned ionization problem. Accordingly, my invention provides corona shield structures 40 and 42 which, in the example shown, are externally connected to terminals 20 and 54 respectively by means of jumper wires from corona shield terminals 50 and 72. Thus, for example, if low voltage source 64 is biased to a positive potential of 20,000 volts by A.C. or D.C. voltage source 66, a strong electrostatic field will be created about lamp 12. Corona shield 40, however, since it is a good conductor and is electrically coupled to the lamp circuit, acts as an electrostatic shield about lamp 12 and serves to concentrate the field uniformly between the two corona shields 40 and 42 while restricting the deleterious effect of the field upon the bulb 12 and element 24.

It is helpful to refer now to FIGS. 3 and 4 wherein the effect of the electrostatic field on the sensitivity of the circuit arrangement of FIG. 2 can be best appreciated. The graph of FIG. 3 represents a series of curves *a* through *f* plotted by varying the voltage of low voltage source 64 from 0 to 6 volts as represented by the horizontal gradations and measuring the resistance of the element 24 by meter 68 as represented by the vertical scale. The plots shown by curves *a*–*f* on FIG. 3 were taken without a wire mesh closure over corona shields 40 and 42 and the readings shown in curve *a* represent the element resistance versus lamp voltage characteristics of the device wherein the low voltage source has zero bias on it. Curve *b* represents the same characteristics with 2,000 volts bias from high voltage source 66, curve *c* 6,000 volts, curve *d* 12,000 volts, curve *e* 18,000 volts and curve *f* 24,000 volts. The curve shown in FIG. 4, wherein the wire mesh enclosure was installed, represents the element resistance versus lamp voltage characteristics for the same circuit configuration over all previous voltage bias increments from 0 to 24,000 volts and illustrates that the effect of the wire mesh screen is to greatly reduce penetration of the electric field into the enclosures and make the performance characteristics of the device relatively independent of variations in operating bias and associated high electrostatic fields. For example, at a 6,000 volt potential bias and a 1.0 volt lamp voltage, according to curve *c* the photocell resistance becomes approximately 5,000 to 7,000 ohms. With the wire mesh screen installed, and an operating bias of 6,000 volts at the same lamp potential of 2 volts, the curve of FIG. 4 indicates a cell resistance of about 50,000 to 70,000 ohms. This phenomena, as was previously noted, is caused by ionization of gases within the bulb because of the high electrostatic field. Said ionization increases the bulb light intensity, thereby reducing the resistance of light sensitive of element 24. As can be seen from a comparison of curve *a* of FIG. 3 with the curve of FIG. 4, the wire mesh screen allows performance of the device unaffected by said electrostatic field.

Although there have been described what are considered to be preferred embodiments of the present invention, various adaptations and modifications thereof will be apparent to those skilled in the art. For example, the photo-sensitive element may be composed of any suitable semiconducting material such as cadmium selenide, lead selenide, germanium, germanium arsenide, silicon, indium phosphide, gallium arsenide, indium stibnide and cadmium sulphide, to enumerate a few. Further, the light source utilized may be any source whose light emission is in the spectral range which will elicit response from the photo-sensitive element as, for example, an incandescent source. The light source may further be of high or low intensity and may be arranged to operate in "ON"–"OFF" fashion or with a gradually changing intensity according to the particular application in which it is desired to utilize the device of the present invention. Furthermore, the apparatus of FIG. 2 may be modified such that the high voltage source biases the light sensitive device in which case changes in light intensity would still result in a corresponding resistance change in the light-sensitive element. Such a device might be used in volume control or A.G.C. operations. Accordingly, it is desired that the invention not be limited except as set forth in the appended claims.

What is claimed is:

1. In combination:
a source of light enclosed in a first electrically conductive structure;
a light-sensitive element enclosed in a second electrically conductive structure;
oppositely disposed electrically conductive screens for concentrating electrostatic fields therebetween so located on each of said first and second conductive structures that light emanating from said light source passes through each of said screens before impinging on said light-sensitive element;
and an opaque enclosure containing said above-recited elements.

2. In combination:
a light source;
a light-sensitive element;
an elastomeric material of dielectric strength greater than air disposed intermediate said light source and said light-sensitive element;
a pair of electrical shielding means disposed intermediate said light source and said light-sensitive element for preventing ionization of gases in said light source and said light-sensitive element;
and an opaque enclosure surrounding said light source, light-sensitive element, shielding means and elastomeric material.

3. In combination:
a light source;
a light-sensitive element;
an elastomeric material of dielectric strength greater than air disposed intermediate said light source and said light-sensitive element;
electrical shielding means disposed intermediate said light source and said light-sensitive element;
and an opaque enclosure surrounding said light source, light-sensitive element, shielding means and elastomeric material having means for coupling a control circuit to said light source, a signal circuit to said light-responsive element and a reference potential to said shielding means.

4. In combination:

a source of light enclosed in a first electrically conductive structure;

a light-sensitive element enclosed in a second electrically conductive structure;

electrically conductive screens so disposed on each of said first and second conductive structures that light emanating from said light source passes through each of said screens before impinging on said light-sensitive element;

optically clear, gelatinous insulating means disposed intermediate said conductive structures;

and an opaque enclosure containing said above-recited components.

5. In combination:

a source of light enclosed in a first electrically conductive structure;

a light-sensitive element enclosed in a second electrically conductive structure;

electrically conductive screens for preventing ionization of gases in said light source and said light sensitive element so disposed on each of said first and second conductive structures that light emanating from said light source passes through each of said screens before impinging on said light-sensitive element;

optically clear, gelatinous insulating means disposed intermediate said conductive structures;

and an opaque enclosure containing said above-recited elements having means for coupling a control circuit to said light source, a signal circuit to said light-responsive element and reference potentials to said conductive structures.

6. In combination:

an opaque enclosure having control circuit coupling means, signal circuit coupling means and shield potential coupling means;

a first means in said enclosure for emitting light of varying intensity in response to a signal from said control circuit;

a second means in said enclosure resistively responsive to said emitted light and coupled to said signal circuit;

electrical shielding means intermediate said first and second means and electrically coupled to said shield potential coupling means for preventing high electrostatic fields from interfering with said first and second means;

and an optically clear, gelatinous, high-dielectric strength medium encapsulating said first, second and third means.

7. In combination:

a light source;

a light-sensitive element;

oppositely disposed electrically conductive screen structures for concentrating electrostatic fields therebetween located intermediate and adjacent said light source and light-sensitive element respectively so that light emanating from said source passes through said screen structures before impinging on said light-sensitive element;

and an opaque enclosure containing said above-recited components.

References Cited in the file of this patent

UNITED STATES PATENTS

| | | |
|---|---|---|
| 1,980,198 | Gray | Nov. 13, 1934 |
| 2,258,218 | Rochow | Oct. 7, 1941 |
| 2,918,584 | Edsberg et al. | Dec. 22, 1959 |
| 2,923,828 | Bernath | Feb. 2, 1960 |
| 2,967,945 | De Gier | Jan. 10, 1961 |
| 2,975,290 | Spitzer | Mar. 14, 1961 |
| 2,991,266 | Bluestein et al. | July 4, 1961 |
| 2,997,596 | Vize | Aug. 22, 1961 |